(12) United States Patent
Lu et al.

(10) Patent No.: US 9,602,590 B1
(45) Date of Patent: Mar. 21, 2017

(54) SHADOWED THROUGHPUT PROVISIONING

(71) Applicant: Amazon Technologies, Inc., Reno, NV (US)

(72) Inventors: Yijun Lu, Kenmore, WA (US); Stuart Henry Seelye Marshall, Seattle, WA (US); Timothy Andrew Rath, Des Moines, WA (US); Rande Anthony Blackman, Seattle, WA (US); Wei Xiao, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 70 days.

(21) Appl. No.: 14/475,190

(22) Filed: Sep. 2, 2014

(51) Int. Cl.
*G06F 15/16* (2006.01)
*H04L 29/08* (2006.01)
*H04L 12/911* (2013.01)

(52) U.S. Cl.
CPC .............. *H04L 67/10* (2013.01); *H04L 47/70* (2013.01)

(58) Field of Classification Search
USPC ................................ 709/201, 224, 223, 226
See application file for complete search history.

*Primary Examiner* — Lan-Dai T Truong
(74) *Attorney, Agent, or Firm* — Baker & Hostetler LLP

(57) ABSTRACT

Partitions of a hosted computing service may be maintained on a computing node. Processing of requests to access the partition may be limited to constrain capacity utilization to a provisioned amount of capacity reserved for the partition. A second, additional amount of capacity may be associated with the partition and may reflect potential future changes to the provisioned amount of capacity. A sum of provisioned and additional capacities associated with partitions on a computing node may be calculated. The computing node may be ranked, relative to other computing nodes, for maintaining new or relocated partitions based on the sum.

20 Claims, 6 Drawing Sheets

SHADOWED THROUGHPUT PROVISIONING

BACKGROUND

A provider may operate various computing services on behalf of its customers. The provision of computing services to a customer may involve management of computing capacity that is consumed during operation of the service. Managing capacity usage may include imposing limits on the amount of capacity that a given service may utilize. In some cases, a provider may receive compensation from the customer based on the capacity limit. In others, exceeding a limit on the amount of capacity utilized by a given service might cause the computing device on which it operates to function less efficiently or to be prone to errors.

The provider of a hosted service may also seek to locate services on computing devices that have sufficient unutilized capacity. However, it may be challenging to measure current utilization of capacity and to project future growth in capacity utilization. As a result, the provider may sometimes determine to relocate a service, or a portion of a service, from one computing device to another. However, relocating a service may be detrimental in various respects, including system downtime, capacity consumption related to moving data associated with the service from one computing device to another, and so on.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
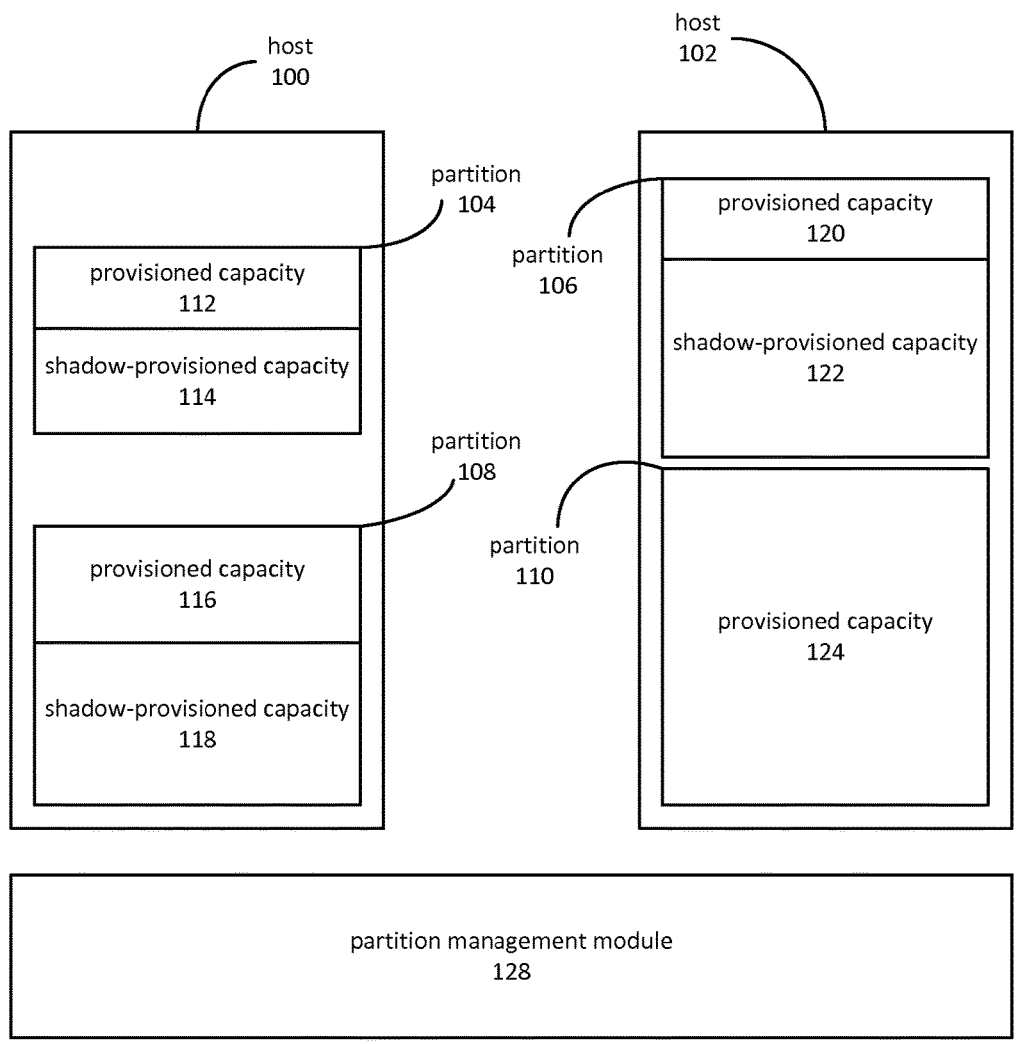
FIG. 1 is a block diagram depicting an embodiment of a distributed database system in which partitions are associated with a provisioned amount of capacity and a shadow-provisioned amount of capacity.

Aspects of the present disclosure may be employed in relation to the provision of hosted services and to managing computing capacity related to the provision of hosted services. This may include management functions related to the locating and movement of partitions on computing nodes. Embodiments may locate or relocate partitions based on a ranking of provisioned capacity associated with partitions assigned to a computing node. The ranking may further be based on an additional amount of capacity, which may be referred to as shadow-provisioned capacity that is associated with the partitions assigned to the computing node. The additional amount of capacity may be calculated using a model of future changes to provisioned capacity for a corresponding partition. A computing node at or near the top of the ranking—where the top corresponds to the least total of provisioned and shadow-provisioned capacity—may be selected for maintaining a new or relocated partition.

Aspects of the present disclosure may also be applied to the allocation of resources in addition to or instead of provisioned capacity. The various mechanisms and techniques described herein may generally be applied to any resource type, including but not limited to provisioned capacity, central processing unit ("CPU") utilization, network bandwidth consumption, storage capacity, and so on. For a given resource type, embodiments may track amounts of the resource which is actually utilized or which is reserved inflexibly, and an additional amount of the resource which is flexibly reserved.

In an embodiment, a system may comprise a plurality of computing nodes configured as a mechanism for maintaining a number of partitions. The system may be configured to have memories comprising computer-readable instructions that, when executed by one or more of the computing nodes, cause the system to process requests to access data in a partition maintained on one of a plurality of computing nodes; limit access to the partition so that utilization of capacity is less than or equal to a reserved amount of capacity; determine an additional amount of capacity associated with the partition and based at least in part on a forecasted change to the reserved amount of capacity; calculate a sum of the reserved and additional amounts of capacity; rank the computing node relative to other computing nodes using the sum; and select the computing node, relative to the other computing nodes, based on the computing node having the highest ranking, where the highest-ranked computing node may be the computing node with the least sum of reserved and additional capacities.

A partition may include data associated with the provision of a service. A partition may also include an association with an amount of capacity that may be used to store or retrieve data in the partition. A partition may refer to database partitions, such as horizontal table partitions, individual tables, collections of tables, and so on. More generally, a partition may refer to a subdivision of computing resources associated with the partition's host computing node.

Embodiments may process requests to access data in the partition, and may limit processing of requests to access data in the partition based on a provisioned amount of capacity. A provisioned amount of capacity may refer to an amount of capacity directly or indirectly requested by a customer of the service. For example, a more expensive service tier might be associated with a higher amount of provisioned capacity, and a less expensive service tier might be associated with a lower amount of provisioned capacity. Embodiments may employ various techniques for enforcing capacity limits. In an embodiment, a rate of capacity consumption may be measured against a maximum rate of capacity consumption. Throttling or delay of service provision may result when capacity is exceeded.

In some cases and embodiments, provisioned capacity may refer to inherent characteristics of a computing node, or to desired levels of resource utilization. For example, a provider of hosted computing services may aim to limit CPU utilization to some maximum amount. That amount may be described as a provisioned level of capacity for CPU utilization. Embodiments may also utilize shadow-provisioned amounts of CPU utilization. Decisions regarding utilization of computing nodes may then be based on consideration of both provisioned and shadow-provisioned levels of CPU utilization.

FIG. 1 is a block diagram depicting an embodiment of a distributed database system in which partitions are associated with a provisioned amount of capacity and a shadow-provisioned amount of capacity. A shadow-provisioned amount of capacity may refer to a forecasted or projected change to a provisioned capacity.

A distributed database system may comprise a number of host computing nodes, such as host 100 and host 102 as depicted in FIG. 1. Each host computing node may maintain a number of partitions. For example, host 100 might maintain partition 104 and partition 108, and host 102 might maintain partitions 106 and 110. Maintaining a partition may include responding to requests to access data on the partition, reading from and writing to storage devices, optimizing and processing queries, and so forth.

Each host may be considered to have a maximum capacity available for processing requests to access data on a partition. Accessing data may comprise storing or retrieving data on the partition, including adding, inserting, updating, or deleting data. The maximum capacity of a partition for deleting data may result from various factors, such as the performance characteristics of processors, memories, storage devices, and network devices that comprise the computing node.

An individual partition may be associated with a maximum amount of capacity that may be expended in order to access data stored on the partition. For example, partition 104 may be associated with a provisioned capacity 112, which may be used to limit consumption of various capacity measures—such as the number, size, cost, or rate of requests to access data in partition 104. Similarly, partition 108 may be associated with provisioned capacity 116, partition 106 with provisioned capacity 120, and partition 110 with provisioned capacity 124. In FIG. 1, for illustrative purposes, the depicted size of provisioned capacities 112, 116, 120, and 124 is intended to show that different amounts of capacity may be provisioned to each partition. In the same vein, the amount of empty space in a host that is not occupied by a partition is intended to illustrate different levels of capacity utilization—host 100, for example, is depicted as having a greater amount of unallocated capacity than host 102.

Embodiments may associate a variable amount of shadow-provisioned capacity with each partition. For example, partition 104 may be associated with shadow-provisioned capacity 114, partition 108 with shadow-provisioned capacity 118, and partition 106 with shadow-provisioned capacity 122. As described in the present disclosure, each partition may be associated with a different amount of shadow-provisioned capacity, including no shadow-provisioned capacity, and the amount of shadow-provisioned capacity for a partition may vary over time.

A distributed database system may comprise various modules for determining where partitions should be maintained, potentially including decisions to relocate partitions to another computing node. For example, as depicted in FIG. 1, a partition management module 128 may perform operations to initially locate or to relocate any of partitions 104, 106, 108, and 110. As used herein, the term module may refer to a set of computer-executable instructions executed by a computing node or to various combinations of computer-executable instructions and circuitry. A partition management module 128 may perform various operations in addition to determining where partitions should be maintained, such as scheduling maintenance operations on partitions, managing the deletion or addition of partitions, enforcing provisioned capacity limits, and so on.

Embodiments of a partition management module 128 may utilize a ranking mechanism to identify a host that is suitable for maintaining a new partition or for maintaining a relocated partition. Embodiments may also utilize the ranking system to identify hosts that may be overloaded. A host's ranking may be based on a summation of capacity measures assigned to each partition on the host. For a given partition, this may include the provisioned capacity amount and a shadow-provisioned amount. For example, relative to host 100, the capacity measures for partition 104 might comprise provisioned capacity 112 and shadow-provisioned capacity 114, and the capacity measures for partition 108 might comprise provisioned capacity 116 and shadow-provisioned capacity 118. A summation of capacity measures for the host could comprise a summation of all of these, i.e., provisioned capacity 112, shadow-provisioned capacity 114, provisioned capacity 116, and shadow-provisioned capacity 118. Similarly, a ranking of host 102 might comprise a summation of provisioned capacity 120, shadow-provisioned capacity 122, and provisioned capacity 124.

As depicted by the example of FIG. 1, host 100 may have greater remaining capacity after accounting for the capacity measures associated with partitions 104 and 108, as compared to host 102 and the capacity measures associated with partitions 106 and 110. Accordingly, an embodiment might rank host 100 more highly than host 102 for the purposes of maintaining a new partition or maintaining a relocated partition. Conversely, an embodiment might rank host 102 higher than host 100 for the purpose of identifying a potentially overloaded host or for identifying a host that might become overloaded in the future.

Ranking of partitions may be performed, in various embodiments, by partition management module 128. Embodiments of partition management module 128 might, for example, sum the capacity measures associated with each partition on a host, store the information in a list, and then perform a sorting operation on the list. Various list ordering criteria might be employed, but assuming that the ranking is from the most to the least amount of unassociated capacity, an entry at the head of the list might be selected as a target for maintaining a new or relocated partition, while an entry at the tail of the list might be identified as a potentially overloaded host or a host that might become overloaded in the future. Embodiments might also search the list to identify a best fit for a particular partition. For example, to relocate a partition an embodiment might search the tail end of the list to identify an overloaded host and to select a partition from the overloaded host for relocating. The list might then be searched, beginning at the head, for a best-fitting host. In some cases and embodiments, this might be the lead element of the list, i.e., the host with the least sum of capacity measures. In other cases and embodiments, a number of entries near the head might be considered, and an entry other than the head selected based on additional factors, such as a desired utilization level.

Figure 2:
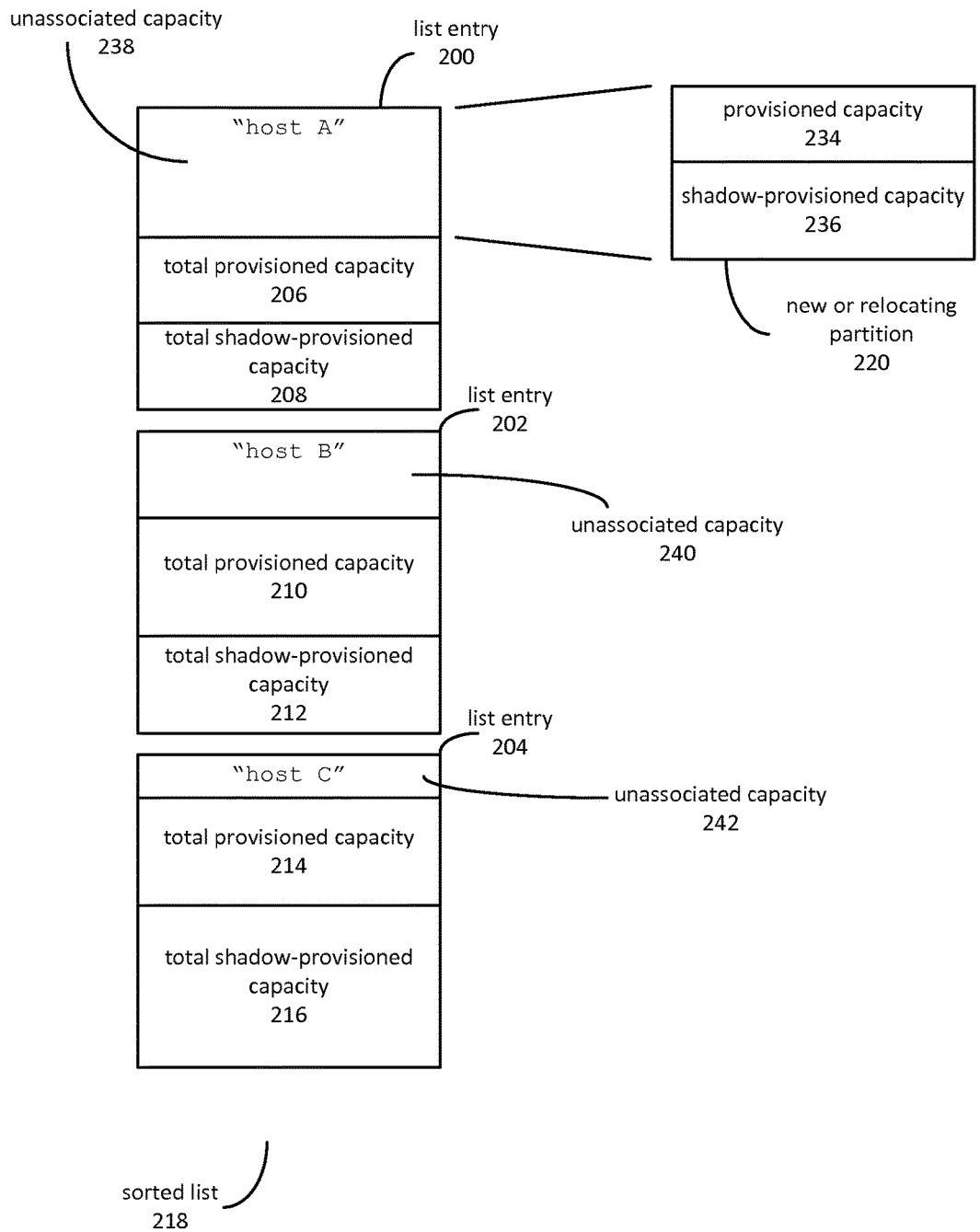
FIG. 2 is a block diagram depicting an embodiment of a sorted list structure for identifying candidates for maintaining new or relocated partitions, or for identifying potentially overloaded partitions or partitions that might become overloaded in the future.

FIG. 2 is a block diagram depicting an embodiment of a sorted list structure for identifying candidates for maintaining new or relocated partitions or for identifying potentially overloaded partitions or partitions that might become overloaded in the future. In FIG. 2, a sorted list 218 might comprise list entries 200, 202, and 204. Each entry may comprise information indicative of capacity measures associated with a host. For example, list entry 200 might represent total provisioned capacity 206 and total shadow-provisioned capacity 208; list entry 202 might represent total provisioned capacity 210 and total shadow-provisioned capacity 212; and list entry 204 might represent total provisioned capacity 214 and total shadow-provisioned capacity 216. The entries in the list may represent total values for all partitions (or in some cases a subset of partitions, such as a set of currently active partitions) for the corresponding host. For example, total provisioned capacity 206 might represent a summation of provisioned capacity values for all active partitions on "host A."

For illustrative purposes, FIG. 2 depicts list entries 200, 202, and 204 with an amount of empty space corresponding to a hypothetical amount of non-associated capacity, i.e., capacity that is neither explicitly provisioned nor shadow-provisioned. Accordingly, it may be seen that in the example of FIG. 2, sorted list 218 comprises list entry 200 in the head position, list entry 202 in an interior position, and list entry 204 at the tail position. A search for a best candidate for maintaining a new or relocated partition might proceed in a head-to-tail direction, which is to say from list entry 200, to list entry 202, to list entry 204. In some embodiments, list entry 200 may be selected without searching the list and instead may be selected based on its position at the head of the list.

FIG. 2 also depicts, for illustrative purposes, a new or relocating partition 220 having a provisioned capacity 234 and a shadow-provisioned capacity 236. Embodiments may select list entry 200 for maintaining new or relocating partition 220 based on its position at the head of sorted list 218. In some cases, a summation of capacities associated with a provision may be greater than the unassociated capacity in a partition. For example, list entry 200, corresponding to "host A," may have an amount of unassociated capacity 238 that is less than a summation of provisioned capacity 234 and shadow-provisioned capacity 236. Embodiments may nevertheless determine to maintain new or relocating partition 220 on "host A," as represented by list entry 200. Embodiments may treat the amount of capacity remaining after accounting for provisioned capacity as a fixed requirement, while treating the amount remaining after also accounting for shadow-provisioned capacity as an influencing but not determinative factor.

The amount of a host's capacity that is not associated with either provisioned capacity or shadow-provisioned capacity may be viewed as an estimate of the host's suitability for maintaining a partition. For example, in FIG. 2, new or relocating partition 220 may be assigned to "host A" (corresponding to list entry 200) with greater confidence than either "host B" (corresponding to list entry 202), or "host C" (corresponding to list entry 204), based on unassociated capacity 238 being greater than unassociated capacities 240 and 242.

Figure 3:
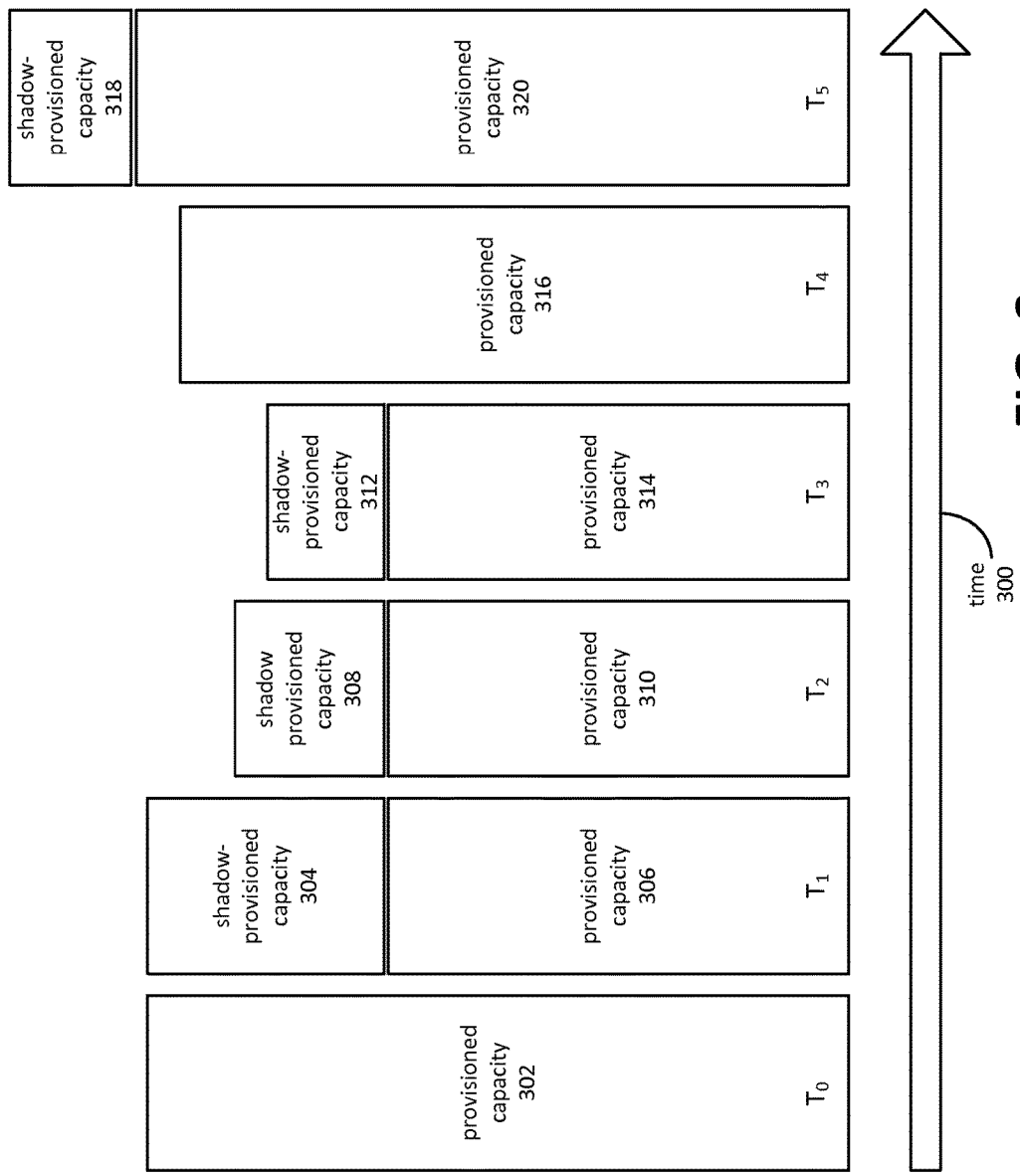
FIG. 3 is a block diagram depicting an example of a model for calculating shadow-provisioned capacity values, the model incorporating forecasts of future changes to provisioned capacity.

The amount of shadow-provisioned capacity associated with a partition and its host, and thus that host's suitability for maintaining a new or relocated partition, may be based on a model that incorporates forecasts of future changes to provisioned capacity. FIG. 3 is a block diagram depicting an example of a model for calculating shadow-provisioned capacity values, the model incorporating forecasts of future changes to provisioned capacity.

Embodiments may utilize models that incorporate time as a factor in projecting future changes to provisioned capacity.

FIG. 3 illustrates various adjustments to the amounts of provisioned and shadow-provisioned capacities over time 300. For example, at an earliest time ($T_0$) a partition might be associated with provisioned capacity 302, and at a latest time ($T_5$) the partition might be associated with provisioned capacity 320 and shadow-provisioned capacity 318.

At $T_1$, provisioned capacity 306 may have been reduced as compared to an initial amount of provisioned capacity 302 at $T_0$. Based at least in part on this reduction, an amount of shadow-provisioned capacity 304 may be associated with the partition. The amount of shadow-provisioned capacity 304 may be based on a number of factors, such as a probability of provisioned capacity 306 being subsequently increased. Embodiments may incorporate modeling that reflects a possible tendency of receiving requests to increase provisioned capacity levels shortly after requesting that a provisioned capacity be decreased. This might, for example, occur when a customer of a hosted service is overly aggressive in trimming the amount of capacity provided to a partition. Embodiments may also incorporate modeling based on recorded or observed patterns of increases or reductions to a provisioned capacity subsequent to an adjustment, such as the adjustment depicted between times $T_0$ and $T_1$ in FIG. 3.

The amount of shadow-provisioned capacity associated with a partition may be adjusted over time. The adjustment may reflect a possible tendency of provisioned capacity to stabilize over time. Stabilization of provisioned capacity may involve stabilization at a constant level, or stabilization along a consistent upwards or downwards trend. Embodiments may incorporate stabilization trends into the calculations of shadow-provisioned values by modeling convergence with a stabilized trend over time. In FIG. 3, an example is provided in which the stabilized trend is assumed to be associated with a constant level of provisioned capacity. Accordingly, at time $T_3$ the amount of shadow-provisioned capacity 312 may be reduced as compared to the shadow-provisioned capacity 308 at time $T_2$, and the amount of shadow-provisioned capacity at time $T_4$ may be reduced relative to the amount at time $T_3$. As depicted in FIG. 3, the amount of shadow-provisioned capacity may at times be reduced to zero.

At time $T_4$, provisioned capacity 316 may be restored to the previous level of provisioned capacity of time $T_0$. In some embodiments, restoration of capacity to a previously provisioned level may be associated with having no shadow-provisioned capacity, i.e., having a projected growth rate of zero, or of zero relative to a stabilized trend.

At time $T_5$, provisioned capacity 320 may have been increased relative to time $T_4$. An increase in provisioned capacity may, in some embodiments, be incorporated into an increase in the amount of shadow-provisioned capacity, as reflected by shadow-provisioned capacity 318, which is increased with respect to the (zero) amount of shadow-provisioned capacity at time $T_4$.

The example depicted in FIG. 3 is intended to be illustrative of factors that may be incorporated into models usable to calculate shadow-provisioned capacity. Numerous alternative models and factors may be utilized.

In an embodiment, shadow-provisioned capacity may be calculated based on historical trends of increases and/or decreases to customer-requested amounts of provisioned capacity. Observations of the timing of increases or decreases may be considered, including the timing of increases or decreases relative to previous adjustments to provisioned capacity.

In an embodiment, shadow-provisioned capacity may be calculated based on the observed trends of the actual consumption of capacity. Embodiments may monitor various metrics for measuring capacity consumption, such as the amounts of data inputted or outputted from a system, and determine how much provisioned capacity for accessing data in a partition was actually consumed. Embodiments may calculate shadow-provisioned capacity based on the capacity actually consumed. In some embodiments, capacity actually consumed may be used independently to calculate shadow-provisioned capacity, while in other embodiments actual consumption may be compared to provisioned capacity amounts. Amounts of shadow-provisioned capacity may be increased as actual consumption of capacity nears provisioned capacity, i.e., when the difference between actual capacity and provisioned capacity is less than a threshold amount.

In an embodiment, shadow-provisioned capacity may be calculated based on patterns or events related to growth of a partition. These patterns or events may include the rate at which data is added to the partition, the addition of a new table, the initiation of a bulk-loading process, and so on. In some embodiments, a customer of a hosted service may provide an indication of expected growth rates that may be used in conjunction with determining shadow-provisioned capacity. Embodiments may calculate shadow-provisioned capacity using analysis of usage patterns. For example, short-term spikes in resource utilization may be discounted, or analyzed to predict if the spike reoccurs in a predictable pattern. Shadow-provisioned capacity may then be calculated based on the current time and the likelihood of a recurring usage spike, seasonal upswing or downswing, or similar pattern occurring at that time.

Figure 4:
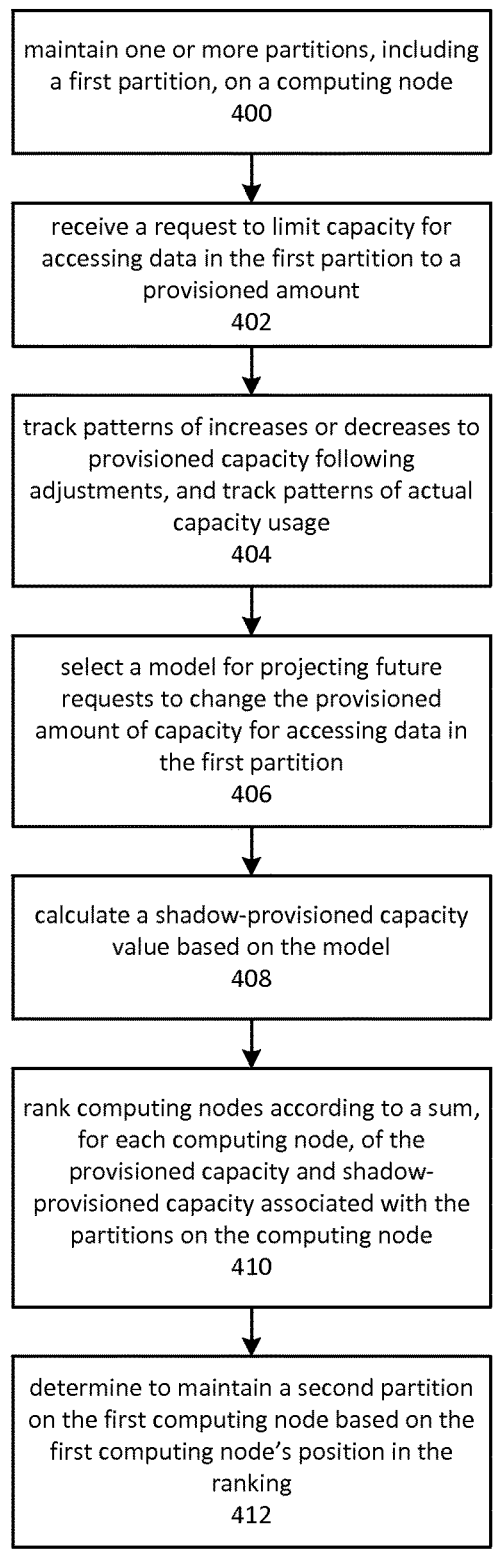
FIG. 4 is a flowchart depicting an embodiment of a process for utilizing provisioned capacity and shadow-provisioned capacity to reduce the relocation of partitions and partition-related data.

Embodiments of the present disclosure may be utilized for minimizing movement of partitions and partition-related data between host computing nodes. FIG. 4 is a flowchart depicting an embodiment of a process for utilizing provisioned capacity and shadow-provisioned capacity to reduce the relocation of partitions and partition-related data. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 400 depicts maintaining one or more partitions on a computing node. Maintaining a partition may comprise performing various operations which can include writing data to the storage associated with the computing node or retrieving data from the storage. Performing operations related to maintaining the partition may utilize capacity. Embodiments may limit utilization of capacity to a provisioned amount. In some embodiments, certain types of operations related to maintaining a partition may be counted against provisioned capacity, while other types of operations may not be.

Element 402 depicts receiving a request to limit capacity for accessing data stored in the first partition to a provisioned amount. The provisioned amount may be an adjustment from a prior amount. A request to limit capacity to a provisioned amount may be associated with a customer request. For example, a customer of a hosted database service might request that a partition be granted more capacity or that the partition's capacity be reduced.

As indicated by element 404, embodiments may track patterns involving increases or decreases to provisioned capacity that may follow adjustments to provisioned capacity. In more general terms, this may involve tracking provisioned capacity over time. Embodiments may identify correlations between increases and decreases in provisioned capacity. This may, in some cases and embodiments, include correlations involving elapsed time, such as the elapsed time between adjustments, elapsed time for an increase in provisioned capacity following a decrease, and elapsed time for a decrease in provisioned capacity following an increase.

Element 404 also depicts tracking patterns of actual usage. Embodiments may identify correlations between the actual utilization of capacity and the provisioned capacity. This may include identifying when the difference between provisioned capacity and actual utilization of capacity falls below a threshold amount, and identifying elapsed time between such events and subsequent requests to increase capacity. A similar approach may be applied to identify elapsed time between the difference increasing above a second threshold amount and a subsequent decrease in provisioned capacity.

As depicted by element 406, a model may be selected for projecting future requests to change the provisioned amount of capacity for accessing data in the first partition. In some embodiments, a model for projecting future changes to the provisioned capacity may be based on the data and correlations tracked or identified in element 404.

Projections of future changes may be incorporated into shadow-provisioned capacity values. Element 408 depicts calculating a shadow-provisioned capacity value for a partition based on a model of projected future changes to the provisioned capacity. Note that although FIG. 4 depicts element 406 (related to selecting a model) and element 408 (related to calculating a shadow-provisioned capacity) as separate elements, some embodiments may combine or omit certain aspects. In other words, the model selection and provisioned capacity computation need not be separate or distinct elements.

Element 410 depicts ranking computing nodes according to a sum, for each computing node, of the provisioned capacity and shadow-provisioned capacity associated with the partitions on the computing node. In some cases and embodiments, the sum may be calculated by the addition of the provisioned capacity and shadow-provisioned capacities. In other cases and embodiments, alternative calculations may be employed, such as weighting, incorporating additional model factors, and so on.

A ranking of the computing nodes hosting partitions may be utilized to identify a location for a new or relocating partition. Element 412 depicts determining to maintain a new partition or a relocated partition on the first computing node, based on the first computing node's position in the ranking. In some cases and embodiments, the first computing node may be identified for hosting the new or relocated computing node based on the first computing node being at the head of the list, which is to say the position with the least total of provisioned and shadow-provisioned capacity. It will be appreciated, however, that embodiments may apply different sorting techniques so that the most favorable computing node might, for example, be at the tail position rather than the head position. Other embodiments might employ structures in which nodes are ranked across multiple dimensions in addition to the sum. Embodiments may perform various forms of searches through a linked structure, such as a list, tree, or graph, and identify a computing node for maintaining the first partition based on criteria that includes both provisioned capacity and shadow-provisioned capacity.

In various cases and embodiments, combinations of resource consumption metrics may be considered in addition to or instead of provisioned capacity. Embodiments may, for example, track utilization of storage space on a computing node and determine to host a partition on the computing node based at least in part on the amount of available storage space. Embodiments may also make the determination based at least in part on an additional amount of storage space which may be described as shadow-provisioned or shadow-utilized. The amount of shadow-utilized storage space may be based on various factors, such as future growth needs or the degree to which the presently available space might be unusable for its intended purpose. For example, in some cases storage space may need to be contiguous but the available space is highly fragmented.

Embodiments may make allocation decisions based on a ranking based on a combination of resource consumption metrics. For example, embodiments may rank computing nodes according to a sum of the provisioned and shadow-provisioned capacity as a primary sort key, and on a sum of consumed storage space and shadow-utilized storage space as a secondary sort key. A computing node at the top position in the ranking could be selected for hosting a partition, where the top position would generally correspond to the most available provisioned capacity and the most available storage space. In some cases and embodiments, shadow-utilized amounts of a metric may be used as confirmation mechanism. For example, a computing node might be tentatively selected to host a partition based on provisioned and shadow-u capacity. An embodiment might then confirm that sufficient storage space exists based on a sum of utilized storage space and shadow-utilized storage space.

In an embodiment of a computer implement method for managing partitions on a plurality of computing nodes, the method may comprise limiting the processing of requests to access data in a first partition of the one or more partitions, where the limiting comprises utilizing no more than a first amount of capacity reserved for accessing data in the first partition. The method may further comprise calculating a second additional amount of capacity for accessing data in the first partition, based at least in part on a forecasted change to the first amount of capacity. The method may further comprise calculating a sum of the reserved amounts of capacity for the one or more partitions, including the first amount of capacity, and additional amounts of capacity for the one or more partitions, including the second additional amount of capacity, and ranking the first computing node relative to other computing nodes based at least in part on the sum. The method may further comprise determining, by the computer, to maintain a second partition on the first computing node, based at least in part on the ranking of the first computing node relative to the other computing nodes in the plurality of computing nodes.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives. As used herein, storing data may refer to performing any of various types of operations that involve writing data, such as adding, inserting, changing, and deleting data. The terms "update" and "updating" data may also be viewed as being synonymous with storing data.

Figure 5:
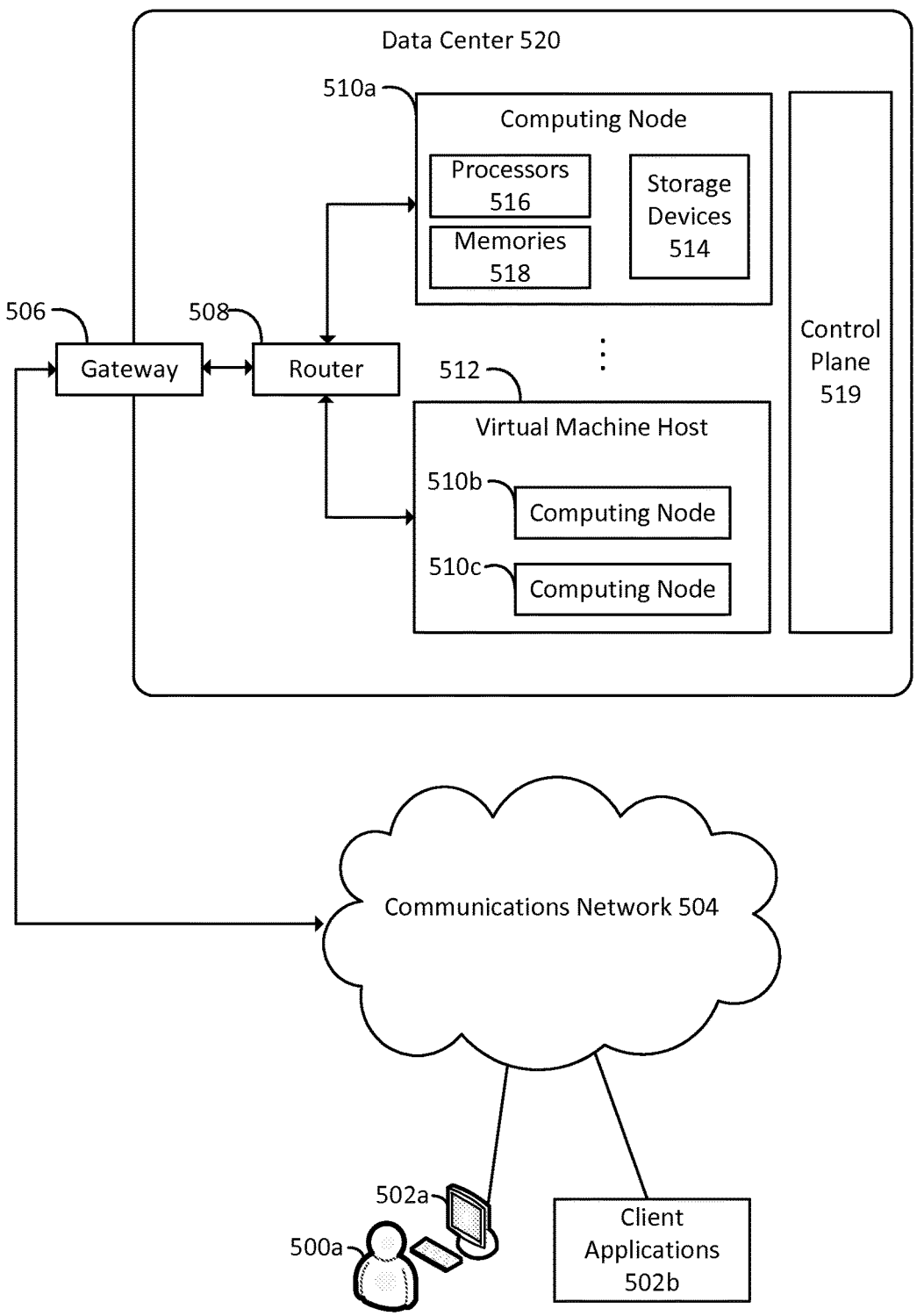
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

A control plane 519 may comprise a computing node configured to coordinate or manage operations of other computing resources in data center 520, such as computing nodes 510a, 510b, and 510c, as well as virtual machine host 512. A control plane 519 may also manage aspects of the configuration and operation of gateway 506 and router 508, as well as various other network components not explicitly depicted in FIG. 5. Embodiments may include a management interface in control plane 519 for managing control functions, such as creating new instances of a computing node (such as computing nodes 510a, 510b, or 510c), adding or configuring a virtual machine host 512, configuring network configuration of router 508, and so on. Embodiments of a control plane 519 may also comprise mechanisms for configuring services or controlling operation of services within data center 520.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
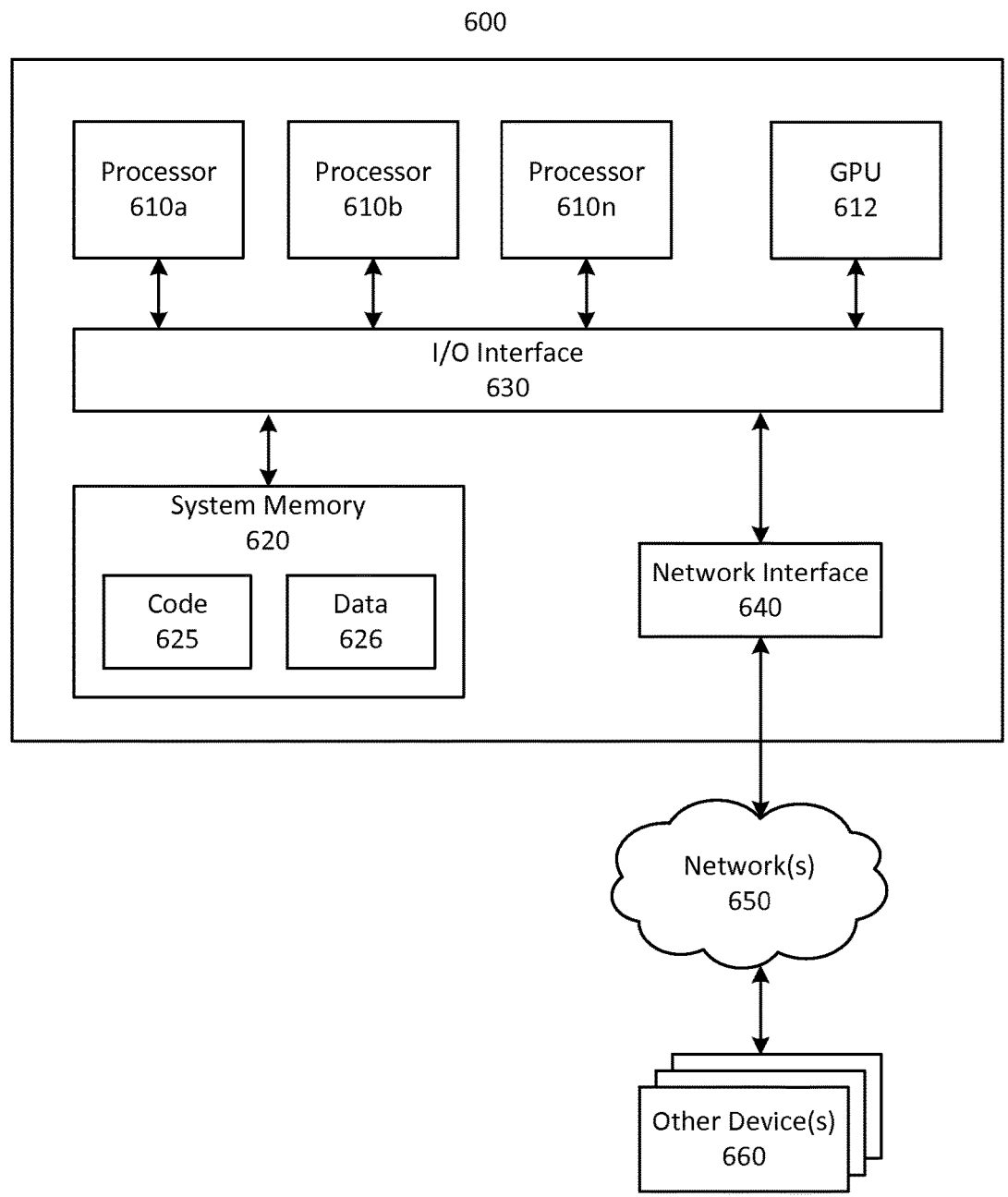
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect ("PCI") bus standard or the Universal Serial Bus ("USB") standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
a plurality of computing nodes maintaining one or more partitions, the one or more partitions comprising a first partition;
one or more memories having stored thereon computer readable instructions that, upon execution by the one or more computing nodes, cause the system at least to:
process requests to access data in a partition maintained on a first computing node of the plurality of computing nodes, wherein capacity of the first computing node to process requests is limited by a first reserved amount of capacity;
determine a second additional amount of capacity based at least in part on a forecasted change to the first reserved amount of capacity;
calculate a first sum comprising reserved amounts of capacity for the one or more partitions, including the first reserved amount of capacity, and additional amounts of capacity for the one or more partitions, including the second additional amount of capacity;
rank the first computing node relative to other computing nodes in the plurality of computing nodes, wherein the ranking is indicative of a comparison between the first sum and a second sum computed for a second computing node; and
select the first computing node, from the plurality of computing nodes, for maintaining a second partition based at least in part on the rank of the first computing node relative to other computing nodes in the plurality of computing nodes.

2. The system of claim 1, further comprising one or more memories having stored thereon computer readable instructions that, upon execution by the one or more computing nodes, cause the system at least to:
receive information indicative of a change to the first reserved amount of capacity;
determine the second additional amount of capacity based at least in part on an amount of time that has elapsed since receiving the information, wherein the second amount of capacity is inversely proportional to the amount of time.

3. The system of claim 1, further comprising one or more memories having stored thereon computer readable instructions that, upon execution by the one or more computing nodes, cause the system at least to:
determine to relocate the first partition to a second computing node of the plurality of computing nodes, based at least in part on comparing the second additional amount of capacity to a remaining amount of capacity.

4. The system of claim 1, further comprising one or more memories having stored thereon computer readable instructions that, upon execution by the one or more computing nodes, cause the system at least to:
determine the second additional amount of capacity based at least in part on a difference between the reserved amount of capacity and a measured amount of capacity utilized for accessing data in the partition.

5. A method of maintaining one or more partitions on a first computing node of a plurality of computing nodes, the method comprising:
limiting, by a computing device, processing of requests to access data in a first partition of the one or more partitions, wherein the limiting comprises utilizing no more than a first amount of capacity reserved for accessing data in the first partition;
calculating, by the computing device, a second additional amount of capacity for accessing data in the first partition, based at least in part on a forecasted change to the first amount of capacity;
calculating, by the computing device, a first sum comprising reserved amounts of capacity for the one or more partitions, including the first amount of capacity, and additional amounts of capacity for the one or more partitions, including the second additional amount of capacity;
ranking, by the computing device, the first computing node relative to other computing nodes in the plurality of computing nodes, wherein the ranking is based at least in part on the first sum; and
determining, by the computing device, to maintain a second partition on the first computing node, based at least in part on the ranking of the first computing node relative to the other computing nodes in the plurality of computing nodes.

6. The method of claim 5, further comprising:
receiving information indicative of a change to the first amount of capacity; and
forecasting the change to the amount of capacity reserved for accessing data in the first partition, based at least in part on an amount of time that has elapsed since receiving the information, wherein the forecasted change is inversely proportional to the amount of time.

7. The method of claim 5, further comprising:
calculating the second additional amount of capacity based at least in part on a measured amount of capacity used to access data in the first partition.

8. The method of claim 5, further comprising:
forecasting the change to the first amount of capacity for accessing data in the first partition based at least in part on a history of changes to the amount of capacity reserved for accessing data in the first partition.

9. The method of claim 5, further comprising:
determining to relocate the first partition to a second computing node of the plurality of computing nodes, the determining based at least in part on the second additional amount of capacity being greater than capacity remaining on the first partition after subtracting reserved and additional amounts of capacity associated with other partitions of the one or more partitions.

10. The method of claim 5, wherein the change to the amount of capacity reserved for accessing data in the first partition is forecasted to decrease over time.

11. The method of claim 5, wherein the ranking is based at least in part on a second sum comprising a metric and a shadow-utilized amount of the metric.

12. The method of claim 5, wherein the forecasted change to the second additional amount of capacity requested is based at least in part on growth of the partition.

13. The method of claim 5, further comprising:
determining to maintain a second partition on the first computing node based at least in part on traversing a structure stored in computer memory that is indicative of the ranking.

14. A non-transitory computer-readable storage medium having stored thereon instructions that, upon execution by one or more computing devices, cause the one or more computing devices at least to:
limit processing of requests to access data in a first partition of the one or more partitions, wherein the limiting comprises utilizing no more than a first amount of capacity for accessing data in the first partition;
calculate a second additional amount of capacity based at least in part on a forecasted change to the first amount of capacity;
calculate a first sum comprising requested amounts of capacity for the one or more partitions, including the first amount of capacity, and additional amounts of capacity for the one or more partitions, including the second additional amount of capacity;
rank the first computing node relative to other computing nodes in the plurality of computing nodes, wherein the ranking is based at least in part on the first sum; and
select the first computing node as suitable for maintaining a second partition, based at least in part on the rank of the first computing node relative to the other computing nodes.

15. The non-transitory computer-readable storage medium of claim 14, comprising further instructions that, upon execution by the one or more computing devices, cause the one or more computing devices to at least:
forecast a change to the first amount of capacity for accessing data in the first partition, based at least in part on time that has elapsed since receiving information indicative of an increase to the first amount of capacity for accessing data in the first partition.

16. The non-transitory computer-readable storage medium of claim 14, comprising further instructions that, upon execution by the one or more computing devices, cause the one or more computing devices to at least:
forecast a change to the to the first amount of capacity for accessing data in the first partition based at least in part on measured amount of capacity used to access data in the first partition being within a threshold amount of the first amount of capacity.

17. The non-transitory computer-readable storage medium of claim 14, comprising further instructions that, upon execution by the one or more computing devices, cause the one or more computing devices to at least:
record a history of amounts of capacity for accessing data in the first partition; and
forecast a change to the amount of capacity for accessing data in the first partition based at least in part on the recorded history.

18. The non-transitory computer-readable storage medium of claim 14, wherein the forecast of a change to the amount of capacity requested for accessing data in the first partition is based at least in part on an event indicative of growth of the partition.

19. The non-transitory computer-readable storage medium of claim 14, comprising further instructions that, upon execution by the one or more computing devices, cause the one or more computing devices to at least:
- select the first computing node from a plurality of computing nodes as suitable for hosting the second partition, wherein the first computing node is selected based at least in part on a ranking of the plurality of computing nodes based on a total amount of reserved capacity and a total amount of projected changes.

20. The non-transitory computer-readable storage medium of claim 14, wherein the second amount of capacity is calculated based at least in part on forecasting a request to increase capacity subsequent to a request to decrease capacity.

* * * * *